United States Patent [19]

Henniges

[11] 4,127,278
[45] Nov. 28, 1978

[54] ELASTIC SEALING RING FOR AXLE BEARINGS OF RAIL VEHICLES

[75] Inventor: Ernst Henniges, Hannover, Fed. Rep. of Germany

[73] Assignee: Gummi-Henniges, Hannover, Fed. Rep. of Germany

[21] Appl. No.: 812,393

[22] Filed: Jul. 1, 1977

[30] Foreign Application Priority Data

Jul. 13, 1976 [DE] Fed. Rep. of Germany ....... 2631357

[51] Int. Cl.² .......................... F16J 15/18; F16J 15/32
[52] U.S. Cl. ................... 277/207 R; 277/153; 277/165; 277/183; 277/212 R; 277/DIG. 4; 277/154
[58] Field of Search ................. 277/DIG. 4, 153, 165, 277/183, 207 R, 119, 154, 211, 212 R

[56] References Cited

U.S. PATENT DOCUMENTS

| 2,487,669 | 11/1949 | Pattullo et al. | 277/207 X |
|---|---|---|---|
| 2,598,094 | 5/1952 | Augereau | 277/153 |
| 2,668,067 | 2/1954 | Fitzsimmons | 277/237 A X |
| 2,692,783 | 10/1954 | Foss | 277/207 X |
| 2,758,853 | 8/1956 | Beck | 277/207 X |
| 2,781,208 | 2/1957 | Foss | 277/212 R |
| 2,858,148 | 10/1958 | Klingler | 277/237 A X |
| 3,214,180 | 10/1965 | Hudson et al. | 277/153 X |
| 3,281,512 | 10/1966 | Reiling | 277/183 X |
| 3,455,564 | 7/1969 | Dega | 277/153 X |
| 3,623,738 | 11/1971 | MacDonnell | 277/DIG. 4 X |

FOREIGN PATENT DOCUMENTS

| 530,099 | 9/1956 | Canada | 277/237 A |
|---|---|---|---|
| 551,751 | 1/1958 | Canada | 277/237 A |
| 825,559 | 10/1969 | Fed. Rep. of Germany | 277/237 A |
| 839,651 | 5/1952 | Fed. Rep. of Germany | 277/153 |

*Primary Examiner*—Robert S. Ward, Jr.
*Attorney, Agent, or Firm*—Gilbert L. Wells

[57] ABSTRACT

Bearing seal, especially for axle bearings of rail vehicles, with a sealing ring insertable into a pocket of the axle sleeve and consisting of an elastic material and provided with a passage fitted to the axle diameter and seating the axle (segment or journal). The sealing ring (5) is provided with an inner ring (7) held elastically and displaceably within an external support (8).

6 Claims, 9 Drawing Figures

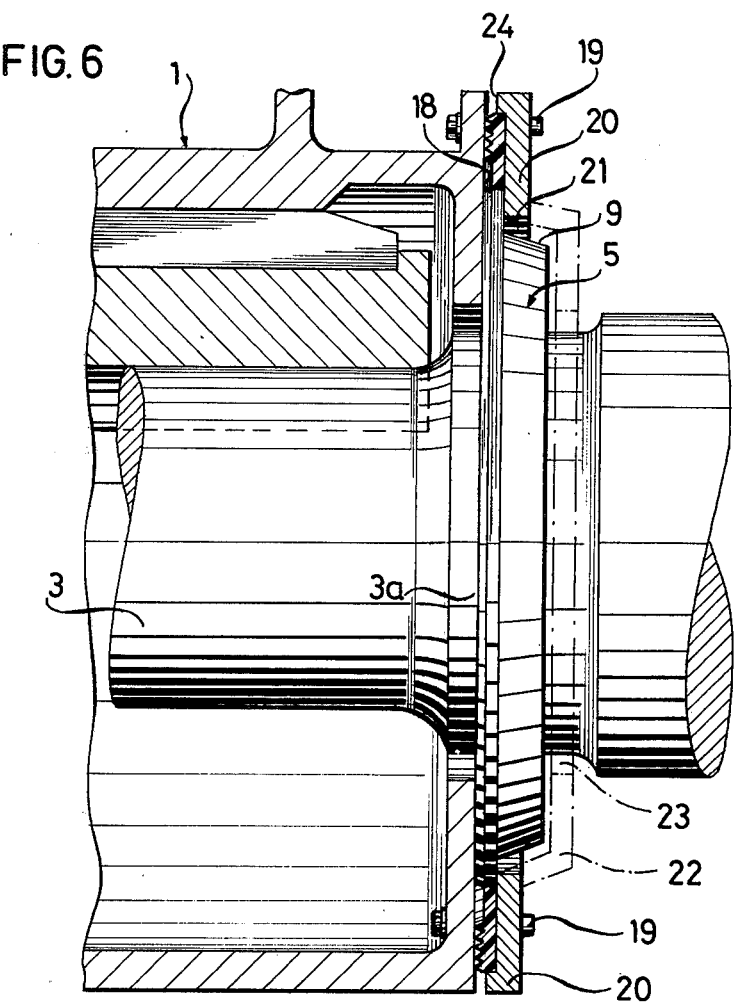
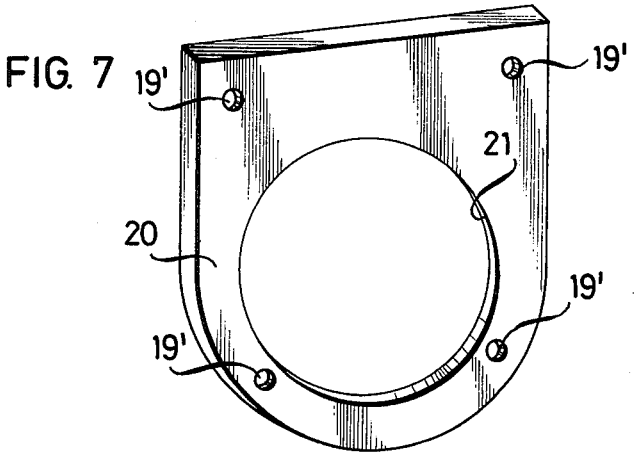

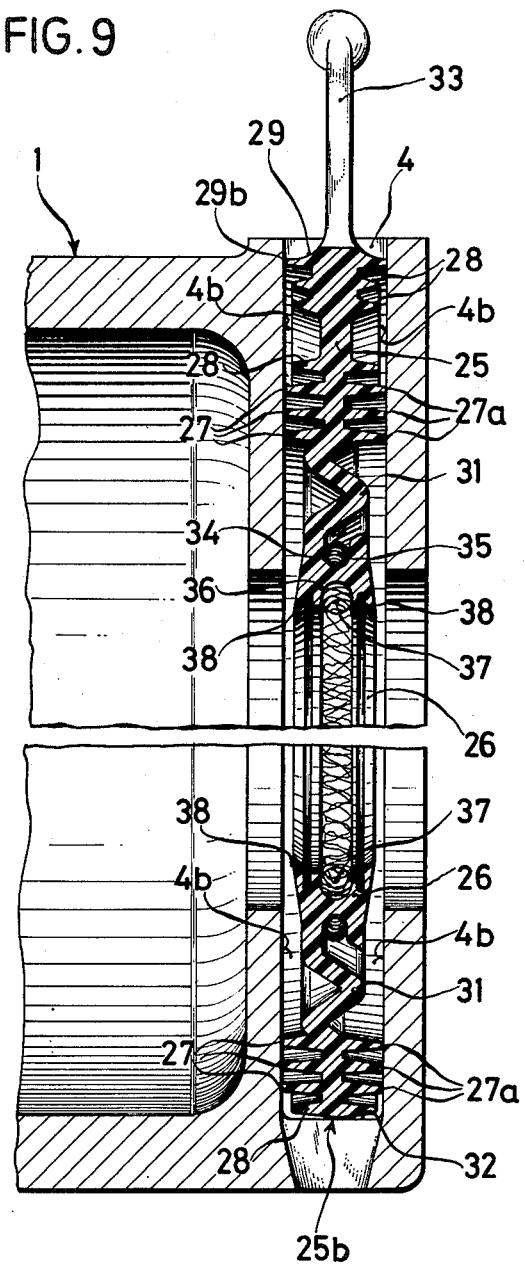

ELASTIC SEALING RING FOR AXLE BEARINGS OF RAIL VEHICLES

BACKGROUND OF THE INVENTION

The invention relates to a bearing seal, especially for the axle bearings of rail vehicles, with a sealing ring insertable into the pocket of the axle-bearing housing, the so-called axle sleeve, and consisting of an elastic material and provided with a passage fitted to the axle diameter and hugging this axle.

Axle-sleeves of this kind are used in railway vehicles comprising sleeve bearings in which the particular bearing shell for absorbing wheel forces is mounted inside the axle sleeve. The purpose of the seals in such cases is to prevent the lubricant from leaking onto the axle or the wheel from the axle sleeve and to ensure adequate sealing.

As regards one prior art system of this kind, the sealing ring consists of foam material fastened to a support of rigid material, for instance plastic, the support having a somewhat larger passage than would correspond to the axle diameter or the passage through the foam. This sealing ring is so held in place inside the axle sleeve pocket that expanding springs are mounted at the lower rim of the support, the ring upon being inserted into the axle sleeve pocket being held by a clamp reaching through the upwardly pointing slit of this axle sleeve pocket. In this prior art system, therefore, the sealing ring is held in such a manner under prestress within the axle sleeve pocket.

This prior art system suffers from the drawback of the position of the passage in that the sealing ring is predetermined by the latter's position in the axle sleeve pocket, whereby one-sided wear within the passage of the sealing ring may occur in the case of dimensional deviations. This wear further may be enhanced by the soft foam of the sealing ring, and lack of tightness with respect to the lubricant may result.

SUMMARY OF THE INVENTION

Having in mind the limitations of the prior art, it is an object of the present invention to create a sealing ring as disclosed above but wherein the sealing ring will provide flawless sealing against the lubricant inside the axle sleeve within the passage for the least possible wear even in the presence of dimensional deviations between the passage of the sealing ring and the housing of the axle sleeve.

This object is achieved by the present invention by providing the sealing ring with an inner ring kept within an external support in an elastic and displaceable manner.

This arrangement permits the sealing inner ring to so displace together with the axle in any offset between axle and bearing shell in the axle sleeve that it will be impossible to have uneven unilateral pressures on the inside wall of the passage of the inner ring, and hence it will be impossible to have unilateral wear. In this manner, even in the presence of a rigidly clamped inner ring support—which means ensuring absolute tightness in the bearing region—one ensures that the inside wall of the inside ring will always tightly lie against the axle in the region of the passage.

Provision is advantageously made for an elastic intermediate member keeping in place the inside ring within the external support.

There is a particular advantage in this respect when the elastic intermediate member, the inside ring and the support are integrally made of an elastic material, for instance an oil-resistant plastic or synthetic rubber. The elastic intermediate member in this case may be like a membrane with one or several folds allowing the displacement of the inside ring with respect to the external support.

In one embodiment of the sealing ring of the present invention, the elastic intermediate member consists of a hood with oblique outer faces which forms part of the inner ring. The inner ring and the hood are suitably so designed in this case that one of the surfaces of the inner ring at the axle-sleeve side is flush with the connecting bearing surface, whereas the hood protrudes on the other side toward the axle.

The inner ring proper may be provided with one or more circular grooves facing the axle and holding sealing means, for instance wool or cotton sealing cords or the like. These sealing cords may be fastened to the groove bottoms preferably by sewing. Cords of this type absorb the lubricant and thus lubricate the axle when they move in this region relative to the inner ring and furthermore contribute in this manner also to sealing. Again the inner and outer partitions formed between the grooves contribute to sealing in the region of the axle in the form of lip-seals.

In order to make the sealing cords rest under prestress against the axle and thus to improve the sealing, the inner ring is advantageously provided on its outside with further grooves, housing for instance springs made of steel wire which pull the inner ring together on account of pretensioning. Furthermore, in this case too, several springs of this type may be mounted and next to another.

The support may be made integral with the inner ring and the elastic intermediate member and is advantageously provided at the end of its surface facing the axle sleeve pocket with further grooves and/or ribs resting against the wall surface of the axle sleeve pocket.

This provides the possibility of achieving additional sealing of the support with respect to such wall by sectioning the axle sleeve pocket, that is, by its having only one plane wall against which the inner ring support can be fastened. This fastening advantageously may be implemented by an additional frame mounted from the outside on the support and which may be externally screwed onto the outer wall of the axle sleeve together with the intermediate member.

It is particularly advantageous in this respect to have the capability of tightening the support itself by means of its elasticity for a corresponding fastening within the axle sleeve pocket or against a wall surface for the purpose of sealing outside the inner ring.

In order to form a bearing seal ensuring complete sealing of the axle sleeve housing even for various embodiments of axle sleeve housing and of the pocket and always with the simplest possible assembly, the invention further provides the support in the region of the inner ring with bilateral circular sealing ribs which in the assembled state rest with their outer edges along their entire periphery under pre-stress against the two opposite walls of the axle sleeve housing pocket.

This arrangement achieves reliable sealing inside the pocket without requiring additional support fastening-devices or clamping systems.

Advantageously the bilateral sealing ribs should be as close to the support inner ring as possible, that is, surrounding the inner ring in circular manner and at a constant distance from it.

Several of these sealing ribs, preferably three mounted in concentric manner, may be appropriately provided.

It is particularly advantageous to provide an additional seal in the region of the sealing surface of the axle. According to the present invention, this additional seal may consist of annular lip-seals formed nest to the grooves for the purpose of housing the sealing cords. The arrangement may be such that in the initial operation only the seals in the grooves, such as the sealing cords, rest against the axle and assume the sealing. This appreciably increases the life of the seal of the present invention. Therefore the inside diameter of the annular lip-seals must be less than that of the axle in the region of the sealed surface.

In order to improve the support seal in the pocket of the axle sleeve housing on one hand, and to ensure precise positioning on the other, support-ribs surrounding the inner ring are advantageously provided which are mounted on both sides on the support surfaces and follow the support edges. In order not to degrade thereby the sealing effect of the sealing ribs, these support-ribs advantageously are somewhat shorter when viewed in cross-section and possibly somewhat more rigid than the circular sealing ribs.

Again, several parallel or concentric support ribs may be provided, two or more being suitably mounted next to each other.

Additionally, at least one more sealing rib may be mounted in the region of the support's upper sealing edge, with a width corresponding to that of the sealing ribs of the inner ring. This additional rib closes the pocket upwards and particularly prevents dust from entering the pocket. The upper most sealing rib may be provided to that purpose at both its ends with an overhanding flat resting against the end faces of the pocket and those limiting the pocket slit.

The two vertical edges contiguous with the horizontal, upper one of the support also may be provided with such a sealing rib which may reach at least as far as the circular ones in the region of the inner ring. These two vertical sealing ribs, in addition to sealing, may also serve to guide and maintain the support in place inside the pocket.

Another and particularly advantageous embodiment for the purpose of providing elastic motion of the inner ring consists in providing the latter with a surrounding bellows-like fold in the plane of the support whereby the center plane of the support also falls into the center plane of the inner ring. Practical tests have shown that a single fold suffices, though if necessary more may also be provided.

The support furthermore may be suitably adapted to the shape of the axle sleeve pocket, i.e., its elevation may be essentially rectangular, whereby the pocket corners below the inner ring or the circular sealing ribs are filled by the support and its support ribs. This prevents forming an oil sump in the lower part of the pocket.

In this case, the shape of the support may be of such a design that its lower surface rests prestressed against the bottom of the pocket in assembly and for the axle in position.

BRIEF DESCRIPTION OF THE DRAWINGS

The present invention may best be described by reference to the appended drawings, wherein:

FIG. 6 is a cutout from the representation of FIG. 2 on a larger scale in a variation of that embodiment;

FIG. 7 is a perspective of a covering frame for the embodiment of FIG. 6;

FIG. 9 is the section IX—IX of FIG. 8.

DESCRIPTION OF THE PREFERRED EMBODIMENTS

Figure 1:
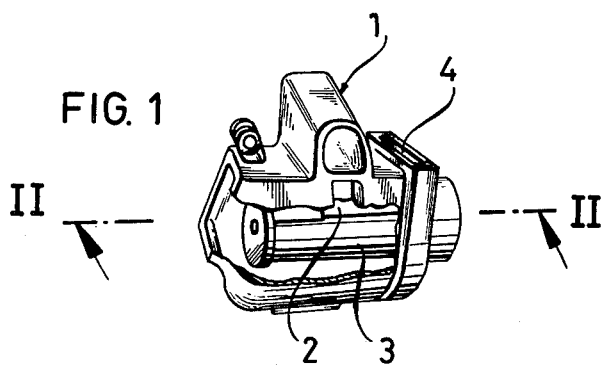
FIG. 1 is a perspective view of the axle sleeve to which this invention applies.

As shown by FIG. 1, provision is made for an axle bearing housing, a so-called axle sleeve 1, wherein there is displaceably mounted and offset with respect to the housing a bearing shell 2 wich absorbs the wheel forces transmitted by axle journal 3. An upwardly open pocket 4 is located in the entry region of axle journal 3 in axle sleeve 1 and this pocket may house a sealing ring 5 (see FIG. 2). Axle sleeve 1 is filled with lubricant and sealing ring 5 prevents this lubricant from reaching the axle or the wheel toward the right in FIG. 1.

Figure 2:
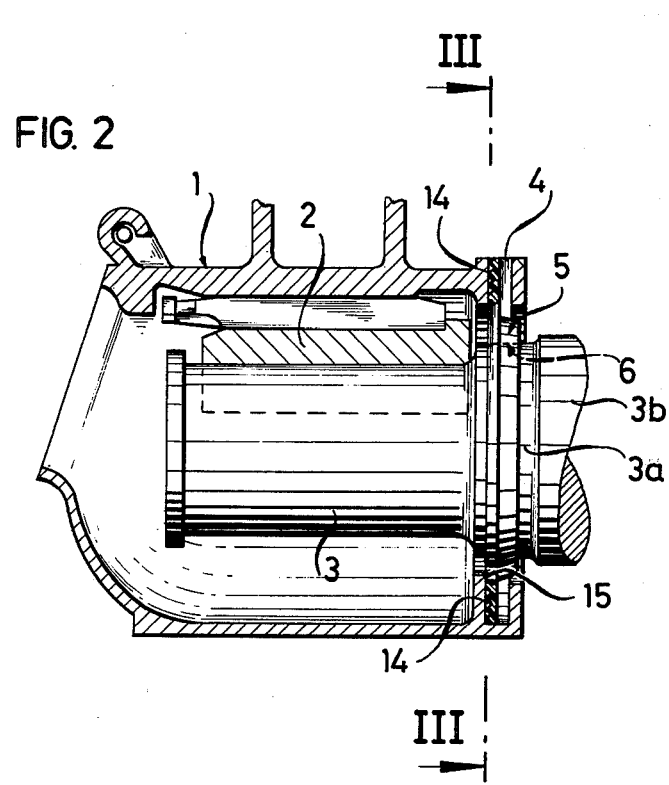
FIG. 2 is the section II—II through the axle sleeve of FIG. 1 with the sealing ring in position.

FIG. 2 is the section II—II of FIG. 1 and shows the arrangement of axle journal 3 and of bearing shell 2 inside housing 1. Sealing ring 5 is mounted into pocket 4 of housing 1 and it is provided with a passage 6 to seat the associated segment 3a of axle 3b.

Figure 3:
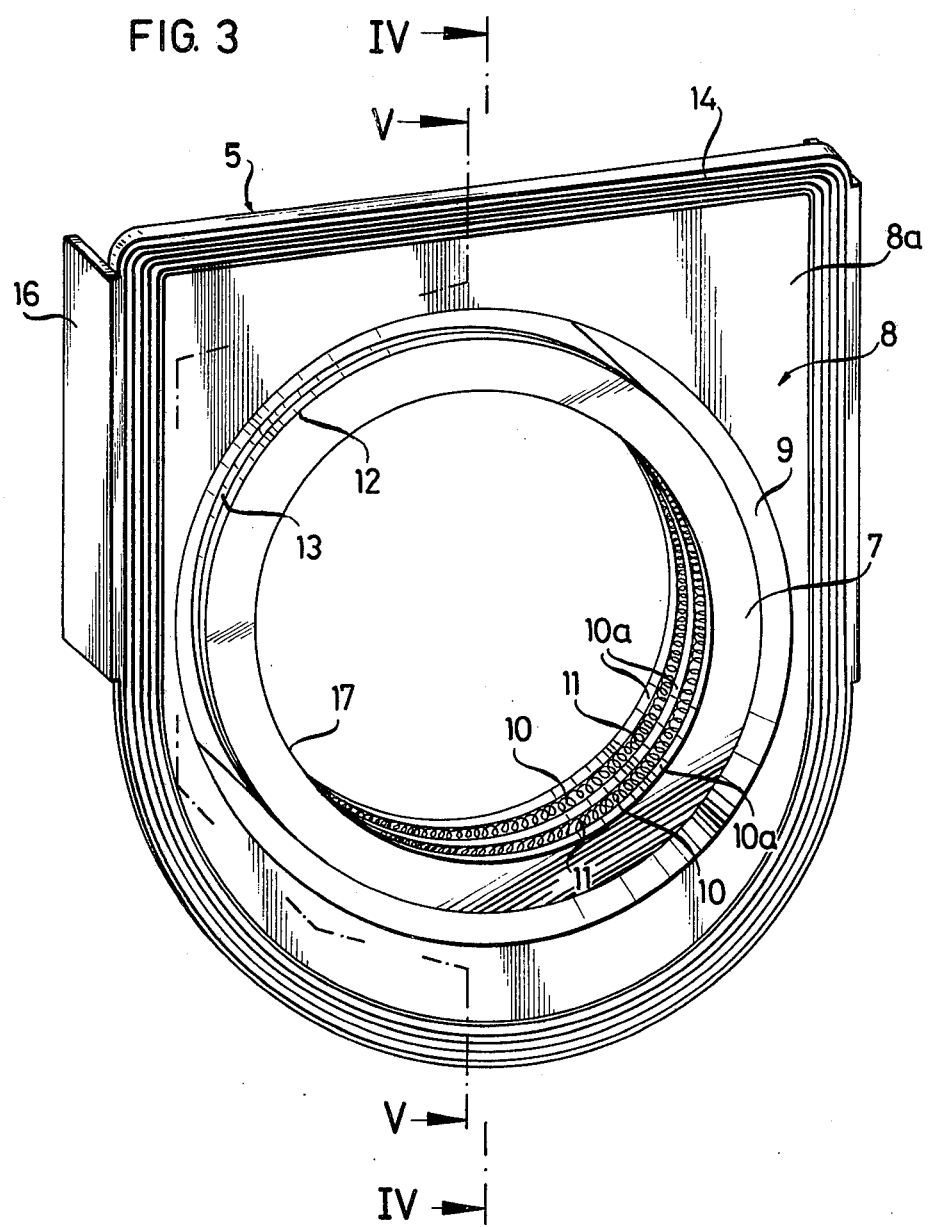
FIG. 3 shows the sealing ring of the invention in perspective in elevation III—III of FIG. 2.

FIG. 3 shows the sealing ring 5 in perspective and alone, along the elevation III—III of FIG. 2.

As shown by Fig. 3, sealing ring 5 is provided with an inner ring 7 mounted elastically and displaceably within an outer support 8. An elastic intermediary member 9 is provided for the displaceable support of inner ring 7 with respect to outer support 8, said intermediary member in this embodiment being shown as a hood (see FIG. 4), but which may also be in the form of a bellows or the like, for the purpose of increasing the flexibility. Inner ring 7, intermediary member 9 and support 8 are made integral in the example shown and of an elastic material, for instance an oil-resistant plastic or a synthetic rubber.

As shown by FIG. 3, the inner ring 7 is provided with two circular grooves 10 facing the axle in this embodiment, where the grooves house sealing cords 11 made of wool or cotton or something similar. These sealing cords 11 are fastened by sewing to the bottom surfaces of the grooves. In order for the sealing cords 11 to rest prestressed against the axle, the inner ring 7 in the embodiment shown is provided on its outside with further grooves 12 housing steel wire springs 13 which are prestressed and thereby somewhat shrink inner ring 7.

Support 8 is provided at the edge of its surface 8a facing the axle sleeve with circular grooves or ribs 14 which rest against wall surface 15 of the axle sleeve pocket 4 (see FIG. 2) when the sealing ring is inserted into pocket 4 (see FIG. 2). Finally support 8 is provided with brackets 16 facing away from the axle sleeve and determining the position within axle sleeve pocket 4 and further forcing the ribs or grooves 14 against wall 15 of this pocket.

Figure 4:
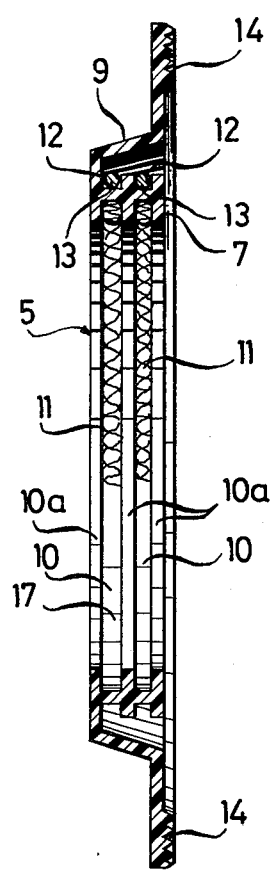
FIG. 4 is the section IV—IV of FIG. 3.

FIG. 4 is the section IV—IV of FIG. 3 and shows particularly clearly the position and arrangement of grooves 10 which house sealing cords 11 and also grooves 12 which hose steel wire springs 13. As sown by FIGS. 3 and 4, the sealing cords 11 in grooves 10 of inner ring 7 surround the latter's passage 17 of which the diameter may be reduced somewhat by spring 13 in such a manner that sealing cords 11 rest prestressed against axle segment 3a (see FIG. 2).

As further shown by FIGS. 3 and 4, the inner and outer partitions 10a between grooves 10 or bounding these may be designed as lip seals resting against axle 3a and thus contributing to sealing.

Figure 5:
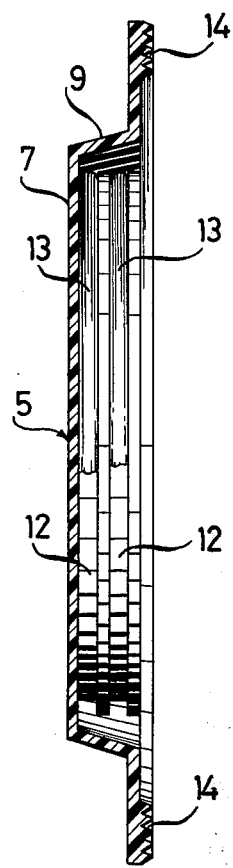
FIG. 5 is the partial section V—V of FIG. 3.

FIG. 5 is the partial section V—V of FIG. 3 and discloses a segment of the inner ring 7 from the outside, showing in particular the position and arrangement of springs 13 inside the outer grooves 12 of the inner ring.

FIG. 6 is a cutaway portion of FIG. 2 on a larger scale for a varied embodiment. In this design the axle sleeve housing lacks a pocket, rather it terminates in an end surface 18 corresponding in view of its position to the inside surface 15 of pocket 4 of FIG. 2. This allows clamping sealing ring 5 by means of screws or bolts against surface 18. This clamping may take place using a frame 20 covering support 8 from the outside and provided with a passage 21 to admit hood 9 of sealing ring 5. Furthermore this frame may be provided with elbowed cap 22 shown in dashed lines and covering hood 9 of the seal 5 so that the latter is protected. Cap 22 in turn is provided with a passage 23 for the pertinent axle segment 3a.

FIG. 7 is a perspective of an embodiment of frame 20, showing the suitable means for screws 19.

Pursuant to FIG. 6, frame 20 may also be provided with a circular flange 24, which covers the outer periphery of sealing ring 5 to prevent damage or penetration of dirt. As shown in FIG. 6, flange 24 terminates at a spacing from surface 18 to allow ribs 14 to rest prestressed against surface 18.

Figure 8:
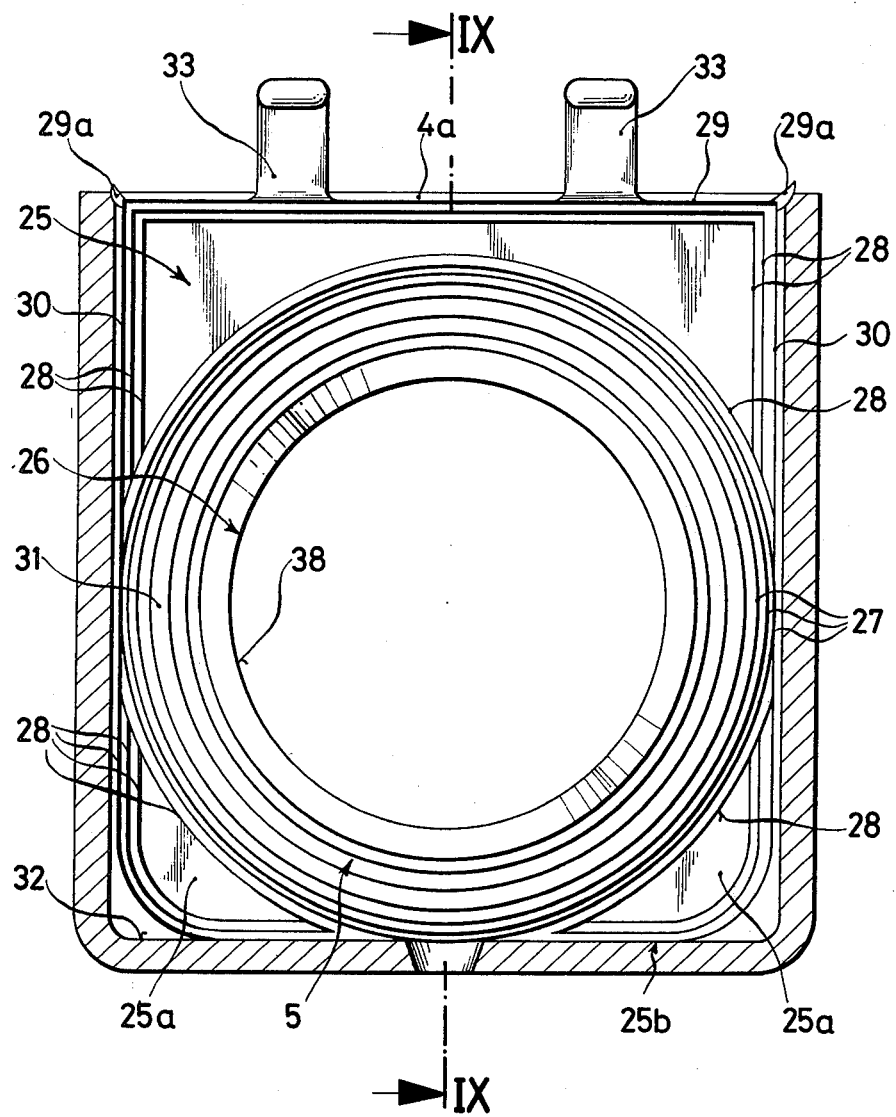
FIG. 8 is an elevation of a variation of the embodiment of the sealing ring with its support inserted into the pocket of the axle sleeve housing.

As regards the embodiment shown in FIG. 8, support 25 of sealing ring 5 is provided in the region of inner ring 26 with bilaterally circular elastic sealing ribs 27 which in an assembled state (of the sealing ring) rest by their outer edges 27a (see FIG. 9) prestressed over their entire circumference against the two opposite walls of pocket 4 of axle sleeve housing 1. As indicated, this embodiment provides three sealing ribs 27 which are mounted circularly and concentrically with respect to inner ring 26.

In addition to sealing ribs 27, support ribs 28 are provided on both sides of support 25, which, as indicated by FIG. 9, are somewhat shorter when viewed in cross-section and if appropriate also somewhat stiffer than sealing ribs 27. Support ribs 28 are mounted in the region of the end faces of support 25 and parallel to these. For the embodiment shown, two support ribs are provided in the upper region and three support ribs 28 in the lower one. Support ribs 28 are replaced by sealing ribs 27 in those regions where the latter reach the end faces of support 25, that is, support ribs 28 terminate at those segments in front of or earlier than the circular sealing ribs 27.

A further sealing rib 29 is mounted in the region of the upper end face of support 25, with a width corresponding to that of sealing ribs 27 of inner ring 26. This sealing rib 29 is meant to seal the pocket 4 in the upward region and for that purpose is provided with an overlapping flap 27a resting on the end surfaces and that bounding the entry slit 4a of pocket 4 and in a sealing manner against the corresponding inner wall of this pocket.

Again the vertical edges joining the upper horizontal edge of support 25 may be provided with a vertical sealing rib 30 which in the embodiment shown extends as far as to the sealing ribs 27 of inside ring 26. Sealing rib 30 below sealing ribs 27 is replaced by a further support rib 28.

In order to keep the inner ring movable, the embodiment of FIG. 8 provides a bellows-like fold 31 surrounding inner ring 26 in the plane of support 25 whereby inner ring 26—as shown by FIG. 9—also is located as regards its center plane in that of support 25.

As further shown by FIG. 8, support 25 is made to adapt in its shape to that of axle sleeve pocket 4 and essentially is rectangular. Thereby corners 25a of support 25 also fill the corners of the pocket, lower surface 25b (see FIG. 9) for the overall assembled state and for inserted axle 3 resting prestressed against bottom 32 of the pocket. Lugs 33 shown in FIG. 8 at the top of support 25 facilitate handling it when inserting it into or withdrawing it out of pocket 4.

FIG. 9 is the section IX—IX of FIG. 8 and particularly shows inner ring 26 being provided with an outwardly open groove 34 seating a steel wire helical spring 35. A groove 36 is provided inside inner ring 27 which houses a sealing cord 37 which for inserted axle 3 rests prestressed against the sealing surface of that axle. Following a given wear of sealing cord 37, the lip seals 38 come to rest against the axle's sealing surface, said lip seals being formed by the inside limit edges of the conical outer surfaces in the region of grooves 36 of inner ring 26. These lip seals 38 following the initial wear of the sling cord 37 together with the latter rest against the sealing surface of axle 3, whereby complete sealing is ensured. For that purpose, the inside diameter of lip seals 38 is less thant that of the axle in the region of the sealing surface.

FIG. 9 further shows the design of the circular fold 31 and the cross-sectionally longer shape of sealing ribs 27 and 29 with respect to support ribs 28.

The outer edges 27a of sealing ribs 27 or 29b rest prestressed against the opposite walls 4b of pocket 4, as shown.

I claim:

1. A bearing seal for axle bearings of rail vehicles having an axle sleeve housing and a pocket in said housing having two oppositely located walls, said bearing seal comprising a sealing ring of an elastic material being insertable into said pocket, said sealing ring provided with a passage seating an axle and fitted to the diameter of said axle, said sealing ring provided with an inner ring held elastically and displaceably within an external support, said support provided with bilaterally circular sealing ribs having outer edges in the region of said inner ring, said sealing ribs resting in an overall assembled state with said outer edges prestressed along their entire circumference against said two oppositely located walls and support ribs being provided in addition to said sealing ribs surrounding said inner ring, said support ribs being mounted bilaterally on the surfaces of said external support and following the edges of said external support.

2. The bearing seal of claim 1, wherein said support ribs are somewhat shorter and more rigid than said sealing ribs surrounding said inner ring when viewed in cross section.

3. The bearing seal of claim 2, wherein a plurality of said parallel and concentric support ribs are provided.

4. The bearing seal of claim 1, wherein at least in the region of the upper terminating edge of said support, an upper sealing rib is provided and mounted having a width corresponding to that of said sealing ribs of said inner ring.

5. The bearing seal of claim 4, wherein said pocket has a slit therein and end faces and said upper sealing rib is provided at both ends with one overlapping flap resting on said end faces and on the external surfaces thereof bounding said slit.

6. The bearing seal of claim 1, where there are two of said bilaterally mounted sealing ribs located in the vicinity of said inner ring of said support circularly surrounding said inner ring and the same distance away from it.

* * * * *